United States Patent
Randall

(10) Patent No.: US 12,491,942 B1
(45) Date of Patent: Dec. 9, 2025

(54) FRAME CASTING ASSEMBLY FOR WORK MACHINE FRAME

(71) Applicant: Caterpillar Inc., Peoria, IL (US)

(72) Inventor: Kort C. Randall, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/812,514

(22) Filed: Aug. 22, 2024

Related U.S. Application Data

(60) Provisional application No. 63/657,227, filed on Jun. 7, 2024.

(51) Int. Cl.
*B62D 21/02* (2006.01)
*B60P 1/04* (2006.01)
*B62D 65/02* (2006.01)

(52) U.S. Cl.
CPC ............... *B62D 21/02* (2013.01); *B60P 1/04* (2013.01); *B62D 65/02* (2013.01)

(58) Field of Classification Search
CPC ........ B62D 21/02; B62D 65/02; B62D 65/04; B60P 1/04; E02F 3/00; B60J 10/45
See application file for complete search history.

(56) References Cited

U.S. PATENT DOCUMENTS

2004/0080132 A1* 4/2004 Chan ..................... B60G 7/008
  280/124.11
2009/0284000 A1  11/2009 Takano et al.

FOREIGN PATENT DOCUMENTS

| | | | |
|---|---|---|---|
| CN | 102555722 A | 7/2012 | |
| CN | 202481142 U | 10/2012 | |
| CN | 102923193 A | 2/2013 | |
| CN | 203358677 U | 12/2013 | |
| CN | 203920902 U | 11/2014 | |
| CN | 104309689 A | 1/2015 | |
| CN | 105460078 A | 4/2016 | |
| CN | 103253305 B | 5/2016 | |
| CN | 106005010 A | 10/2016 | |
| CN | 206086879 U | 4/2017 | |
| CN | 208216837 U | 12/2018 | |
| CN | 208264347 U | 12/2018 | |
| CN | 210733732 U | 6/2020 | |
| CN | 112721564 A | 4/2021 | |
| CN | 116812002 A | 9/2023 | |
| CN | 220243364 U | 12/2023 | |
| DE | 10330314 A1 * | 2/2005 | ........... B60G 21/051 |

(Continued)

OTHER PUBLICATIONS

Durif, JP-4970044-B2, Machine Translation of Specification (Year: 2012).*

(Continued)

*Primary Examiner* — Drew J Brown
*Assistant Examiner* — Matthew Joseph Ganci

(57) ABSTRACT

A frame casting assembly for a frame of a work machine is disclosed. The frame casting assembly comprises a first end, a middle section, and second end, the first end extending from the middle section and the second end extending from the middle section; the middle section includes: a shaft cutout; a box casting section for managing bending; a first leg and a second leg extending from the middle section; a bridge casting section connecting the first leg and the second leg; and the box casting section and the bridge casting section enclose the shaft cutout.

20 Claims, 5 Drawing Sheets

(56) References Cited

FOREIGN PATENT DOCUMENTS

JP            4970044 B2 *   7/2012   ................ B60P 1/16

OTHER PUBLICATIONS

Schmidt, DE-10330314-A1, Machine Translation of Specification (Year: 2005).*
Written Opinion and International Search Report for Int'l. Patent Appln. No. PCT/US2025/031315, mailed Sep. 11, 2025 (12 pgs).

* cited by examiner

FRAME CASTING ASSEMBLY FOR WORK MACHINE FRAME

TECHNICAL FIELD

The present disclosure generally relates to structural components for work machines, and more particularly relates to frames for work machines.

BACKGROUND

Work machines, such as mining dump trucks, excavators, backhoes, front-end loaders, shovels, draglines, skid steers, wheel loaders, and tractors, are subjected to immense mechanical stresses during operation. These machines often operate in harsh environments, requiring robust structural components that can withstand significant loads, including torsional and bending stresses.

Traditional frame designs for such heavy machinery typically involve welded assemblies, which can be prone to stress concentration and fatigue failures at the weld joints. The use of multiple, large welded components can also lead to increased manufacturing complexity and cost. As the demand for heavy machinery increases, there is a need for innovative frame designs that provide enhanced durability and performance while addressing the unique challenges associated with varying systems.

Various attempts have been made to improve the structural integrity of frames for heavy machinery. For instance, some designs incorporate reinforced sections to manage bending loads, while others use specialized materials to enhance fatigue resistance. However, these solutions often involve trade-offs in terms of weight, manufacturability, and overall cost.

Hence, there is a need for a frame that improves the ability to manage complex torsion and extreme bending loads, providing a robust and efficient solution for heavy machinery work machines.

SUMMARY

In accordance with one aspect of the disclosure, a frame casting assembly for a frame of a work machine is disclosed. The frame casting assembly comprises a first end, a middle section, and second end, the first end extending from the middle section and the second end extending from the middle section; the middle section includes: a shaft cutout; a box casting section for managing bending; a first leg and a second leg extending from the middle section; a bridge casting section connecting the first leg and the second leg; and the box casting section and the bridge casting section encloses the shaft cutout.

In accordance with another aspect of the disclosure, a work machine is disclosed. The work machine comprises a frame; a prime mover mounted on the frame; a ground engaging element supporting the frame; and a frame casting assembly in the frame including: a first end, a middle section, and second end, the first end extending from the middle section and the second end extending from the middle section; the middle section includes: a shaft cutout; a box casting section for managing bending; first leg and a second leg extending from the middle section; a bridge casting section connecting the first leg and the second leg; and the box casting section and the bridge casting section encloses the shaft cutout.

In accordance with another aspect of the disclosure, a method of forming a torsional casting assembly for a frame of a work machine. The method comprises: providing a central box section designed to manage bending loads; forming a first end and a second end extending from each side of the central box section to manage torsional loads; extending a first leg and a second leg from the central box section; forming a shaft cutout from the central box section, the first leg, and the second leg to accommodate a driveshaft; and integrating a bridge casting section to connect the first leg and the second leg.

These and other aspects and features of the present disclosure will be better understood upon reading the following detailed description when read in conjunction with the accompanying drawings.

Figure 1:
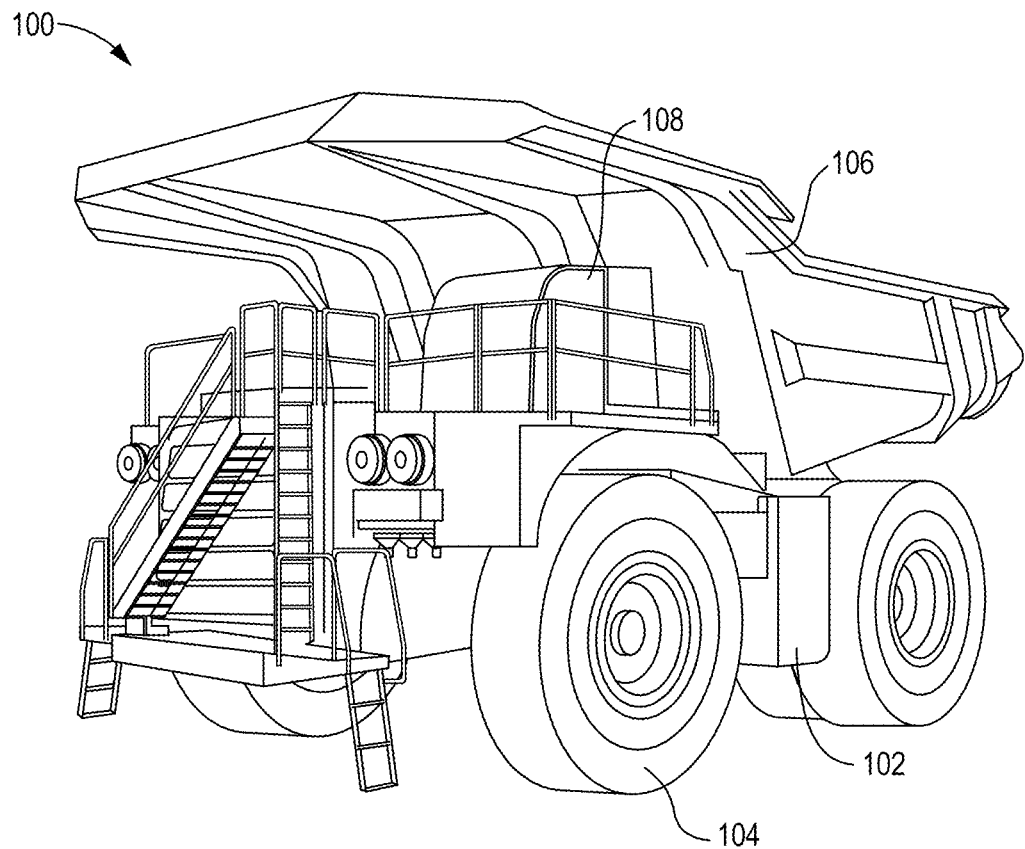
FIG. 1 is a perspective view of a work machine, according to an embodiment of the present disclosure.

The figures depict one embodiment of the presented invention for purposes of illustration only. One skilled in the art will readily recognize from the following discussion that alternative embodiments of the structures and methods illustrated herein may be employed without departing from the principles described herein.

DETAILED DESCRIPTION

Referring now to the drawings, and with specific reference to the depicted example, a work machine 100 is shown, illustrated as an exemplary mining dump machine. Mining dump machines are heavy equipment designed to transport large quantities of earth material from the ground or landscape at a mining site. While the following detailed description describes an exemplary aspect in connection with the mining dump machine, it should be appreciated that the description applies equally to the use of the present disclosure in other machines, including, but not limited to, excavators, backhoes, front-end loaders, shovels, draglines, skid steers, wheel loaders, and tractors, as well.

FIG. 1 is a perspective view of the work machine 100, according to an embodiment of the present disclosure. The work machine 100 illustrated is a mining dump machine. The work machine 100 includes a frame 102 designed to withstand the immense loading and stresses encountered during operation. The frame 102 is supported on ground engaging elements 104, which can be continuous tracks or wheels, providing stability and mobility on rough terrain. A prime mover (not shown) may be mounted on the frame 102 which powers the work machine 100, such as a gas engine, diesel engine, battery electric motor, fuel cells, series of battery cells, battery packs, alternative energy source, as generally known in the art. The work machine 100 further includes a large payload area 106 for transporting mined materials, and a cab 108 for operator personnel to control the machine. The cab 108 is positioned to provide optimal visibility and control over the mining operations. The work machine 100 may be a hauling mining vehicle which may be further provided on a durable 231-tonne (255-ton) frame.

Figure 2:
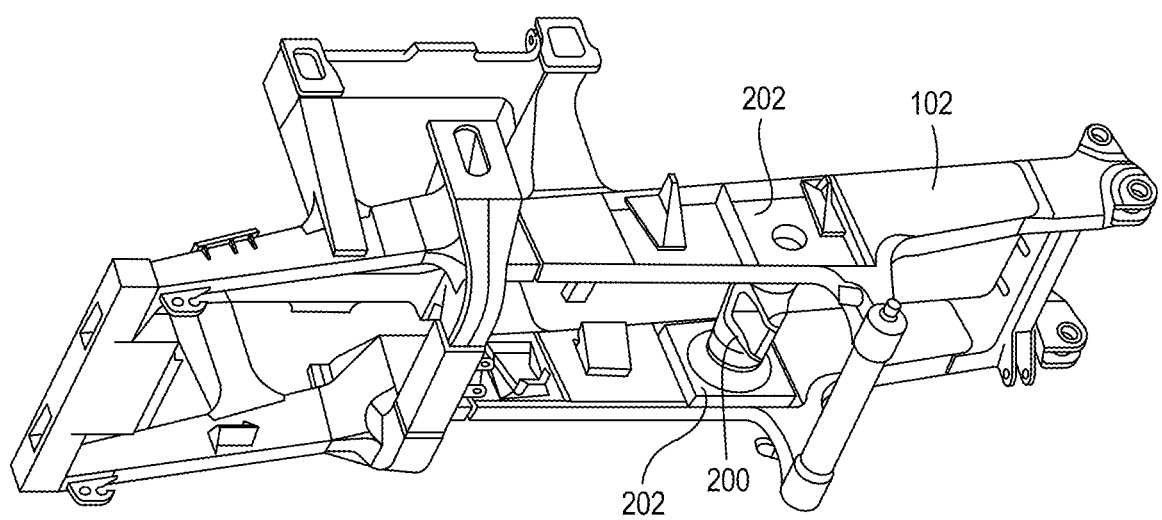
FIG. 2 is a perspective view of a frame of the work machine of FIG. 1, according to an embodiment of the present disclosure.

Now referring to FIG. 2, FIG. 2 illustrates a perspective view of the frame 102 of the work machine 100, according to an embodiment of the present disclosure. The frame 102 is a critical structural component designed to bear the immense loads and stresses encountered during the operation of the mining dump machine. The frame 102 is robustly constructed to support the various components of the work machine 100, including the payload area and the cab 108. The frame 102 includes a frame casting assembly 200 within the frame 102. The frame casting assembly 200 may be connected to the frame 102 via plates 202.

Figure 3:
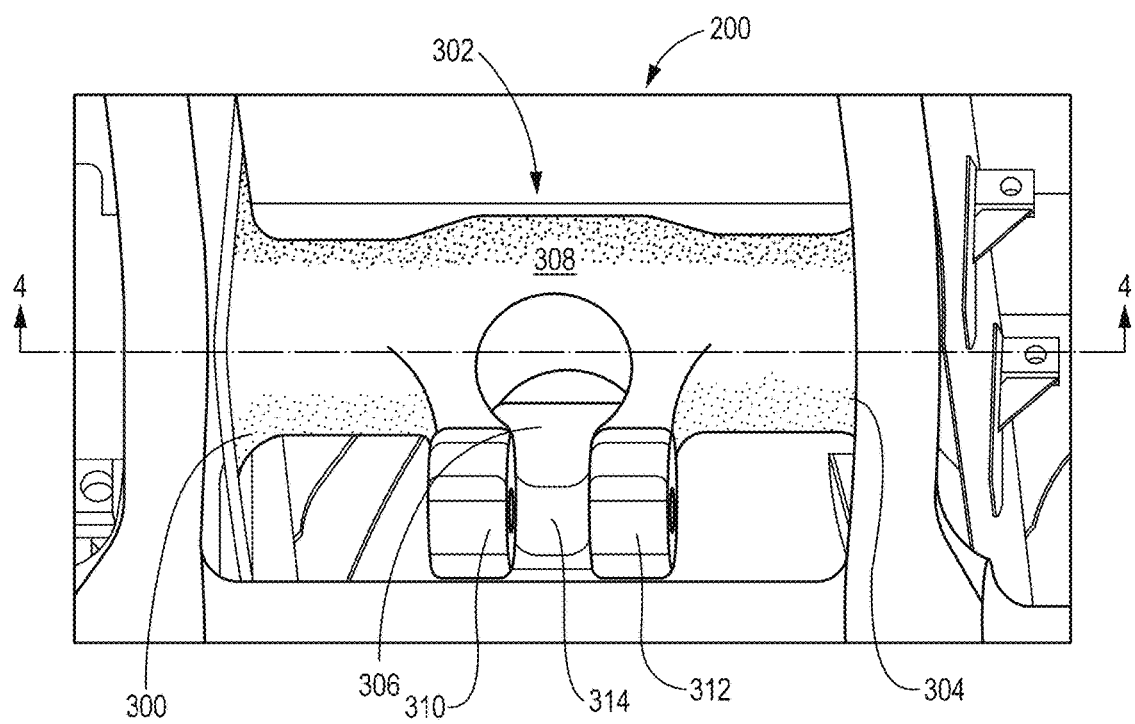
FIG. 3 is a perspective close up view of a casting in the frame of FIG. 2, according to an embodiment of the present disclosure

FIG. 3 provides a closer perspective view of the frame casting assembly 200 within the frame 102, according to an embodiment of the present disclosure. The frame casting assembly 200 includes a first end 300, a middle section 302, and a second end 304. The first end 300 extends from the middle section 302, and the second end 304 extends from the middle section 302, creating a continuous structure that enhances the frame's torsional and bending resistance.

The middle section 302 of the frame casting assembly 200 features a shaft cutout 306, which accommodates a driveshaft (not shown) of the work machine 100, ensuring that the frame casting assembly 200 integrates seamlessly with other components of the work machine 100. Additionally, the middle section 302 includes a box casting section 308 designed to manage bending stresses, providing additional strength and rigidity to the frame casting assembly 200.

Extending from the middle section 302 are a first leg 310 and a second leg 312, which contribute to the structural integrity of the frame casting assembly 200. These legs are connected by a bridge casting section 314, which forms a solid connection between the legs, reducing inward twist and protecting the bolted joints. This design ensures that the frame casting assembly 200 can effectively handle the mechanical stresses and operational loads encountered during mining operations.

Figure 4:
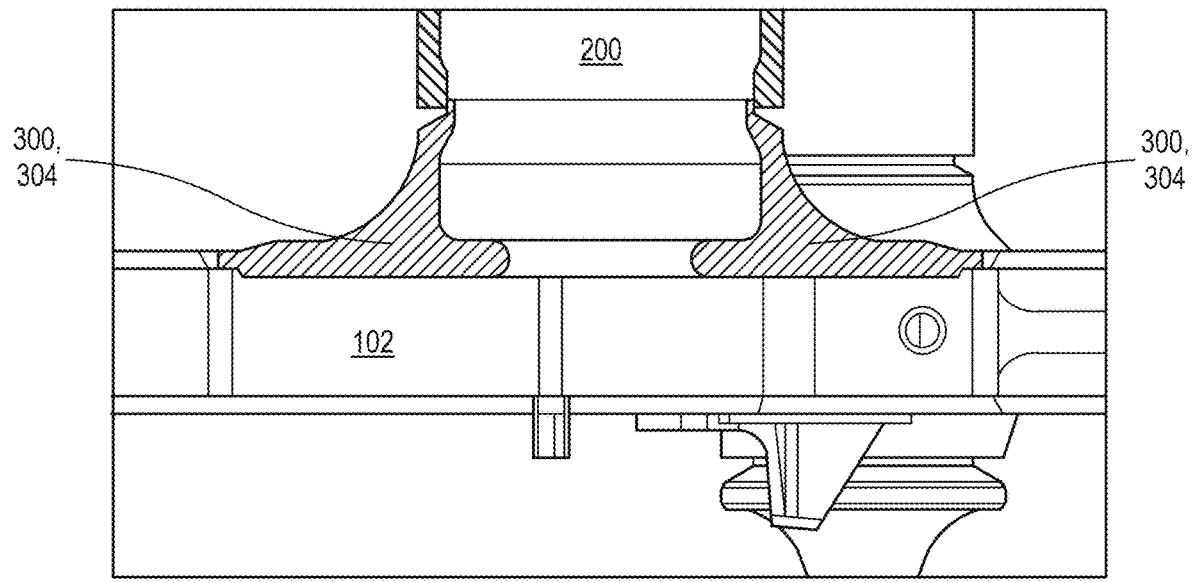
FIG. 4 is a cross-sectional top section view of an end of the casting of FIG. 3 in the frame of FIG. 2, taken along line 4-4 of FIG. 3, according to an embodiment of the present disclosure.

FIG. 4 is a cross-sectional top section view of an end of the frame casting assembly 200 of FIG. 3 connected to the frame 102, taken along line 4-4 of FIG. 3, according to an embodiment of the present disclosure. This view provides a detailed look at how the circular cross-sections at the first end 300 and the second end 304 of the frame casting assembly 200 manage torsional stresses. The circular design directs the stress into the casting radii, minimizing the potential for stress concentration and weld failure. The box casting section 308 in the middle reduces bending stresses, enhancing the overall durability and performance of the frame casting assembly 200.

The first end 300 and the second end 304 of the frame casting assembly 200 feature integrated circular cross-sections designed to handle torsional loads effectively. These sections enhance distributing the torsional stress uniformly across the frame, thereby reducing localized stress and potential points of failure. The cross-sectional design also facilitates easier assembly and alignment with other frame components. The first end 300 and the second end 304 are welded to the middle section 302. The first end 300 and the second end 304 are welded to the middle section 302 so as to extend from each end of the middle section 302.

Figure 5:
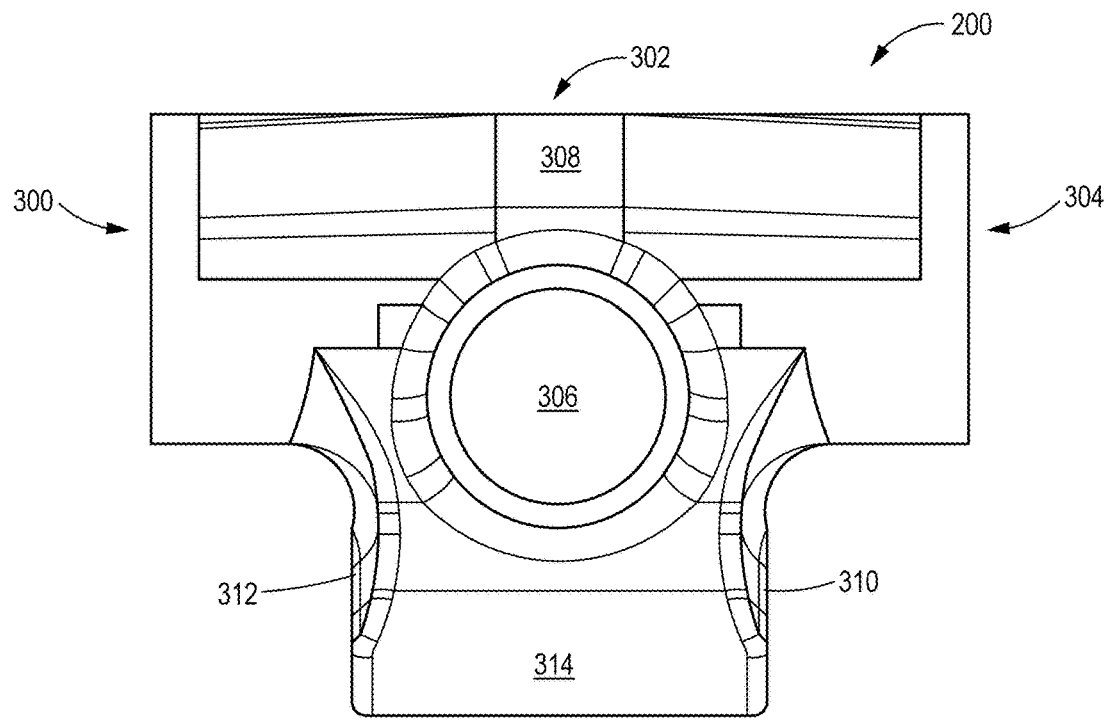
FIG. 5 is a schematic front view of the casting of FIG. 3, according to an embodiment of the present disclosure.

FIG. 5 is a schematic front view of the frame casting assembly 200 of FIG. 3, according to an embodiment of the present disclosure. The first end 300 and the second end 304 are visible, each with a circular cross-section designed to manage torsional loads. The middle section 302 of the frame casting assembly 200, as shown in FIG. 5, includes the shaft cutout 306, which accommodates the driveshaft and ensures seamless integration with other mechanical components. The box casting section 308 provides structural reinforcement to manage bending loads, and the bridge casting section 314 forms a robust connection between the first leg 310 and the second leg 312, enhancing the frame's overall stability and resistance to mechanical stresses The bridge casting section 314 plays a role in maintaining the structural integrity of the frame casting assembly 200 by reducing inward twist and protecting the bolted joints. This section ensures that the frame casting assembly 200 can withstand the operational loads and mechanical stresses typical in mining operations, providing a reliable and durable solution for the work machine 100.

The design of the frame casting assembly 200, including the combination of circular cross-sections at the first end 300, the second end 304, and the box casting section 308 in the middle section 302, ensures that the frame 102 can effectively handle both torsional and bending stresses. This approach enhances the performance and longevity of the frame 102, making it a robust solution for heavy-duty mining applications.

Figure 6:
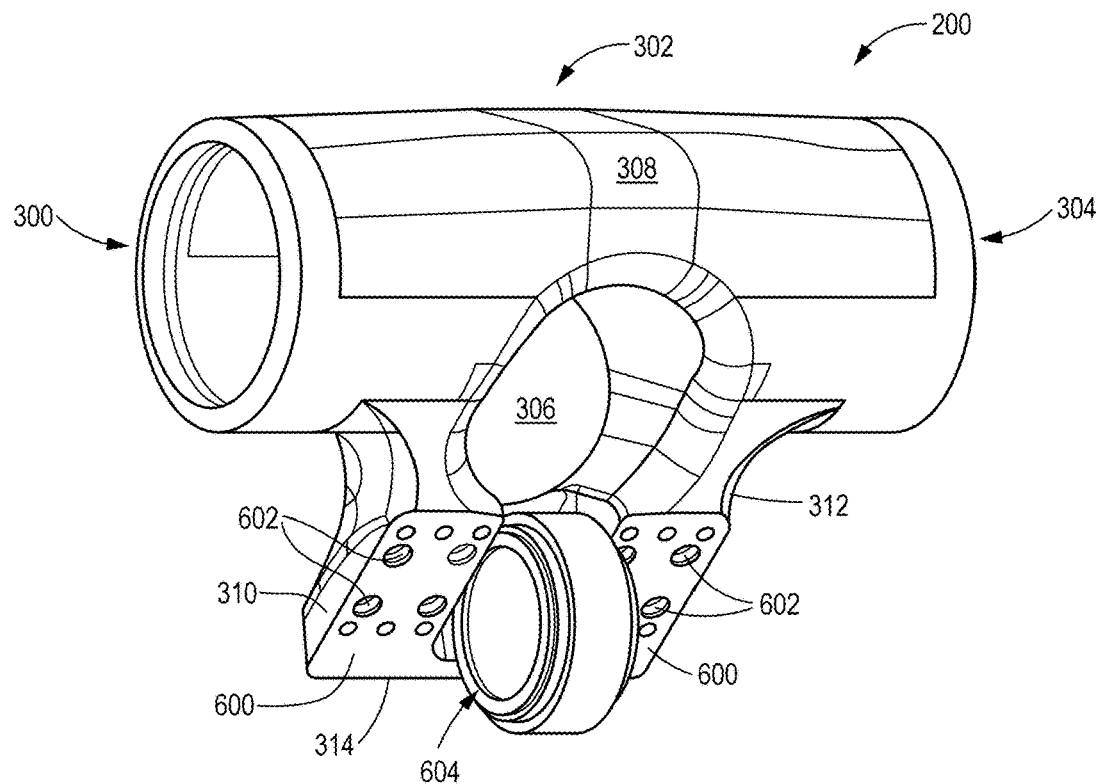
FIG. 6 is a perspective rear view of the casting of FIG. 3, according to an embodiment of the present disclosure.

FIG. 6 is a perspective rear view of the frame casting assembly 200 of FIG. 3, according to an embodiment of the present disclosure. The frame casting assembly 200 includes a dowel 600 on both the first leg 310 and the second leg 312. These dowels are placed to enhance the structural integrity and torsional resistance of the frame casting assembly 200. The dowel 600 features a plurality of holes 602, which are designed to accommodate fasteners or bolts, thereby securing the bearing mount block and further enhancing the connection between the legs and other frame components.

The clearance 604 between the first leg 310 and the second leg 312 of the frame casting assembly 200 accommodates an A-frame nose cone, ensuring that there is adequate space for the nose cone to fit without interference. The clearance 604 is carefully measured to provide sufficient room while maintaining the structural integrity of the frame casting assembly 200.

The perspective rear view of FIG. 6 also illustrates the seamless integration of the bridge casting section 314, which connects the first leg 310 and the second leg 312. This bridge casting section 314 not only reduces inward twist and protects the bolted joints but also provides a robust support structure that enhances the overall stability and durability of the frame casting assembly 200.

The design of the dowels 600 with their plurality of holes 602 ensures that the frame casting assembly 200 can be securely fastened to other components, thereby preventing any potential displacement or misalignment during operation. This feature is particularly important in maintaining the precise alignment and functionality of the work machine 100, especially under heavy loading conditions.

The frame casting assembly 200, with its combination of structural features such as the dowels 600, the clearance 604, and the bridge casting section 314, provides a comprehensive solution that addresses both torsional and bending stresses. This design ensures that the frame casting assembly 200 can withstand the rigorous demands of mining operations, providing a durable and reliable foundation for the work machine 100.

INDUSTRIAL APPLICABILITY

In operation, the present disclosure may find applicability in various industries, including, but not limited to, the automotive, construction, earth-moving, mining, and agricultural industries. Specifically, the systems, machines, and methods described herein may be utilized for forming robust and durable frames for heavy hauling work machines, such as mining dump trucks, excavators, backhoes, front-end loaders, shovels, draglines, skid steers, wheel loaders, and tractors. The work machine 100 may be powered by a prime mover that is a battery electric engine, a gas engine, a hybrid engine, fuel cell or cryogenic engines, and any other energy producing systems for machines, as generally known in the arts.

Figure 7:
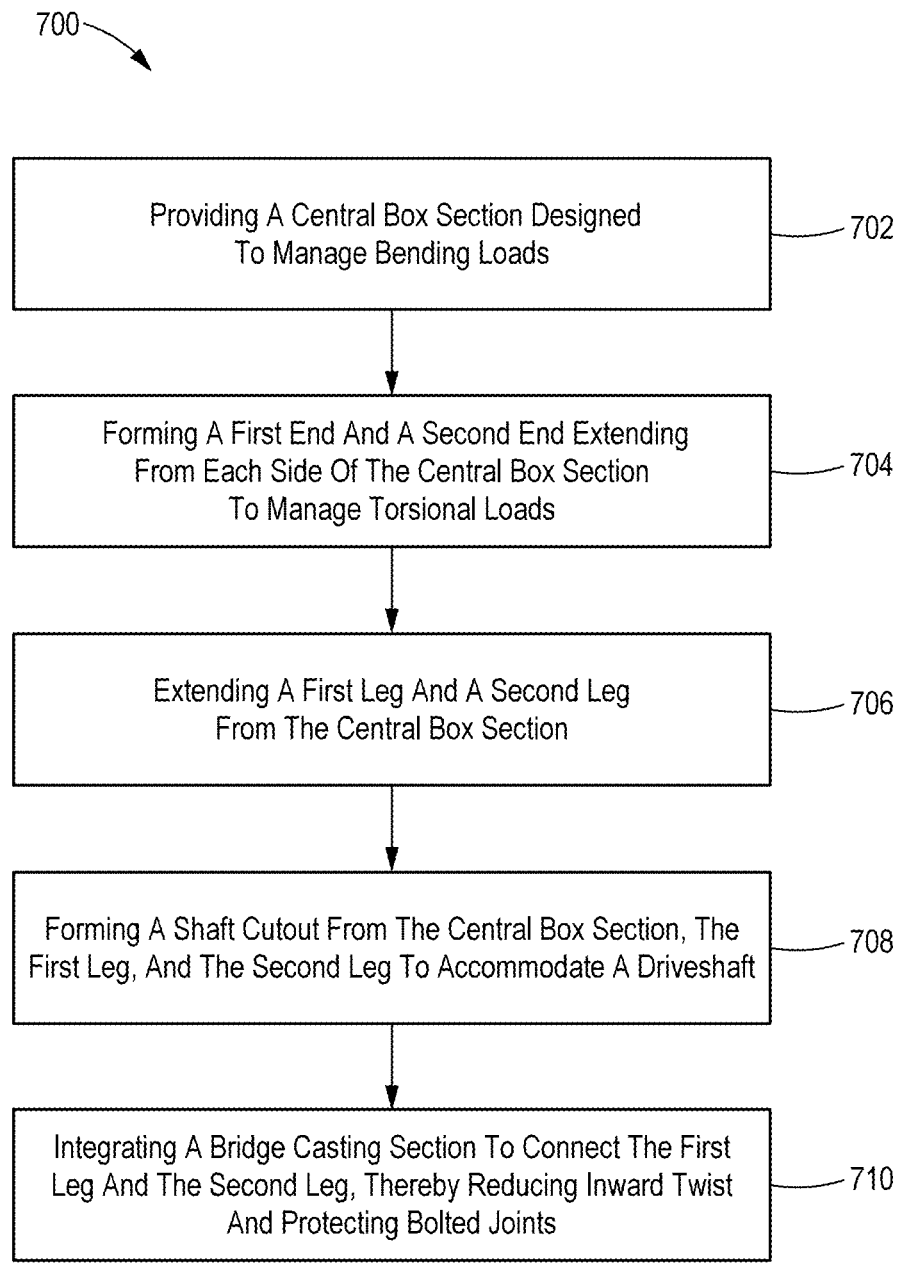
FIG. 7 is a flow-chart of a method of forming a torsional casting for a frame of the work machine of FIG. 1, according to an embodiment of the present disclosure.

FIG. 7 is a flow-chart of a method 700 of forming a torsional casting for a frame of the work machine of FIG. 1, according to an embodiment of the present disclosure. The method 700 comprises several steps designed to create a robust and durable frame casting assembly 200 capable of handling the mechanical stresses encountered in heavy-duty operations.

In step 702, the method 700 begins by providing a box casting section 308 designed to manage bending loads. This box casting section 308 forms the central part of the frame casting assembly 200 and is critical for maintaining structural integrity under bending stresses.

In step 704, circular cross-sections are formed at each end of the box casting section 308 to manage torsional loads. These circular cross-sections for the first end 300 and the second end 304 help distribute torsional stress evenly, reducing the risk of stress concentration and potential failure points.

In step 706, the method involves extending a first leg 310 and a second leg 312 from the box casting section 308, illustrated in a central location in the frame casting assembly 200. These legs contribute to the overall stability and strength of the frame casting assembly 200.

In step 708, a shaft cutout 306 is formed from the box casting section 308, the first leg 310, and the second leg 312 to accommodate a driveshaft. This cutout ensures seamless integration with the other mechanical components of the battery electric machine.

In step 710, a bridge casting section 314 is integrated to connect the first leg 310 and the second leg 312, thereby reducing inward twist and protecting bolted joints. This bridge section enhances the overall durability and performance of the frame casting 200.

The method 700 further comprises forming a dowel 600 configured to the first leg 310 and the second leg 312, each dowel 600 having a plurality of holes 602 for connecting bolts and/or mounting a rear axle support structure. The dowel 600 ensures secure connections and contribute to the frame casting assembly 200's ability to withstand operational stresses.

Additionally, the method includes ensuring a clearance 604 between the first leg 310 and the second leg 312 which may accommodate a portion or protrusion of a rear axle support structure. This clearance 604 supports fitting a portion or protrusion of a rear axle support structure without interference, maintaining the functional integrity of the frame casting assembly 200.

The method 700 may also include integrating mounting flanges on the first end 300 and the second end 304, providing additional points for attaching structural components or accessories, thus enhancing the versatility and applicability of the frame casting assembly 200 in various industrial applications.

The method 700 may also include mounting the frame casting assembly 200, also referred to as a torsional frame casting or structural casting, to the frame 102 of the work machine 100, via the first end 300 and the second end 304.

The design and method of forming the torsional casting for the frame 102 of a work machine provide a comprehensive solution that addresses both torsional and bending stresses. This innovative approach ensures the frame 102's performance and longevity, making it a robust solution for demanding industrial applications. The use of casting allows for precision in forming complex shapes and managing space constraints, making it a highly efficient and effective solution for heavy-duty applications.

From the foregoing, it can be seen that the technology disclosed herein has industrial applicability in a variety of settings such as, but not limited to agricultural, construction, and mining industries that utilize machines such as excavators, backhoes, rope shovels, skid steers, wheel loaders, tractors, and similar machines having work implements for non-hauling operations.

What is claimed is:

1. A frame casting assembly for a frame of a work machine, comprising:
   a first end portion;
   a middle section;
   a second end portion, the first end portion extending from the middle section in a first direction, and the second end portion extending from the middle section in a second direction opposite the first direction;
   a first leg;
   a second leg extending in a same direction as the first leg; and
   a bridge casting section connecting the first leg and the second leg,
   wherein the middle section includes:
      a shaft cutout, and
      a box casting section configured to manage bending, and
   wherein the first leg, the second leg, the box casting section of the middle section, and the bridge casting section enclose the shaft cutout, and
   wherein in a front elevational view of the frame casting assembly the shaft cutout is between the box casting section and the bridge casting section in a direction perpendicular to the first and second directions.

2. The frame casting assembly of claim 1,
   wherein the first end portion and the second end portion each have a casting section having a circular cross-section at its ends to manage torsion, and
   wherein the first end portion and the second end portion are welded to the middle section.

3. The frame casting assembly of claim 1, wherein the first end portion, the middle section, and the second end portion are aligned on a same center axis.

4. The frame casting assembly of claim 1, wherein the first leg and the second leg are configured to connect to a rear axle support structure.

5. The frame casting assembly of claim 1,
   wherein the first leg extends from the middle section,
   wherein the second leg extends from the middle section, and
   wherein the bridge casting section connects the first leg and the second leg at respective ends of the first leg and the second leg opposite respective ends thereof from which the first and second legs extend from the middle section.

6. The frame casting assembly of claim 1, wherein the frame casting assembly is transversely attachable to a frame of the work machine connected via the first end portion and the second end portion.

7. The frame casting assembly of claim 1, wherein the first and second end portions include integrated mounting flanges.

8. The frame casting assembly of claim 1,
wherein the first and second end portions extend from the middle section in the first and second directions, respectively, in the front elevational view of the frame casting assembly, and
wherein on a side of the frame casting assembly opposite the bridge casting section, the middle section extends continuously from the first end portion to the second end portion in the front elevational view.

9. A work machine comprising:
a frame;
a prime mover mounted on the frame;
a ground engaging element supporting the frame; and
a frame casting assembly in the frame including:
a first end, a middle section, and second end, the first end extending from the middle section and the second end extending from the middle section;
the middle section includes:
a shaft cutout;
a box casting section for managing bending;
a first leg and a second leg extending from the middle section;
a bridge casting section connecting the first leg and the second leg; and
the box casting section and the bridge casting section encloses the shaft cutout,
wherein the frame casting assembly includes integrated mounting flanges on the first end and the second end.

10. The work machine of claim 9, wherein the first end and the second end each have a casting section with a circular cross-section at its ends to manage torsion, and the first end and the second end are welded to the middle section.

11. The work machine of claim 9, wherein the first end, the middle section, and the second end are aligned on a same center axis.

12. The work machine of claim 9, wherein the first leg and the second leg are configured to connect to a rear axle support structure.

13. The work machine of claim 12, wherein the bridge casting section is configured to reduce inward twist.

14. The work machine of claim 9, wherein the work machine is a hauling dump machine.

15. The work machine of claim 9, wherein the frame casting assembly is made from a high-strength alloy.

16. The work machine of claim 9, wherein the frame casting assembly is symmetrical about an axis extending through the middle section a center of the shaft cutout, and the bridge casting section in a front elevational view of the frame casting assembly.

17. A method of forming a torsional casting assembly for a frame of a work machine, comprising:
providing a central box section configured to manage bending loads;
forming a first end portion and a second end portion extending from opposite sides of the central box section;
providing a first leg and a second leg each extending from the central box section;
forming a shaft cutout from the central box section, the first leg, and the second leg to accommodate a driveshaft; and
integrating a bridge casting section to connect the first leg and the second leg,
wherein the first end portion and the second end portion each include an integrated mounting flange at respective ends thereof.

18. The method of claim 17, further comprising:
forming the first end portion and the second end portion extending from the opposite sides of the central box section to manage torsional loads.

19. The method of claim 17, further comprising:
ensuring a clearance between the first leg and the second leg to accommodate a rear axle support structure.

20. The method of claim 17, further comprising:
mounting the torsional casting assembly to the frame of the work machine, via the first end portion and the second end portion.

* * * * *